Oct. 2, 1934.   A. J. CALPHA ET AL   1,975,250
HYDRAULIC FEED CONTROL APPARATUS
Filed Aug. 30, 1930   2 Sheets-Sheet 2
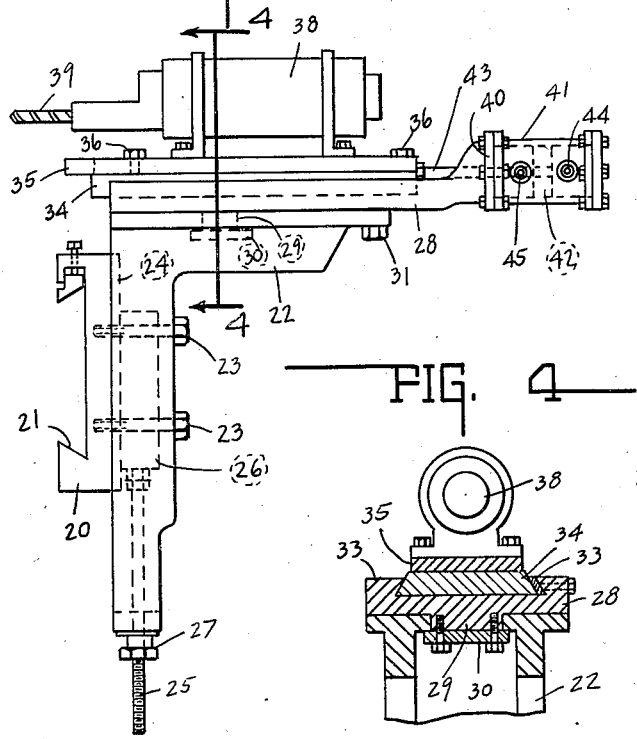
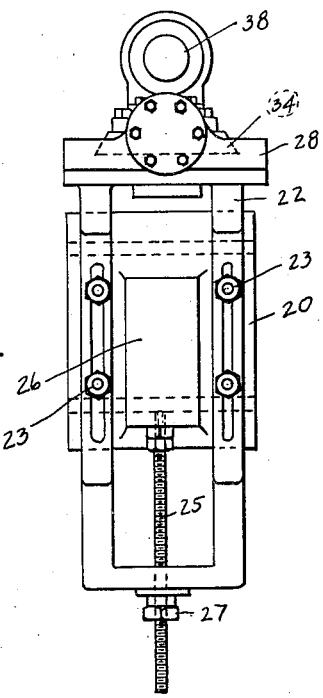
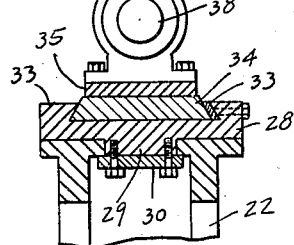
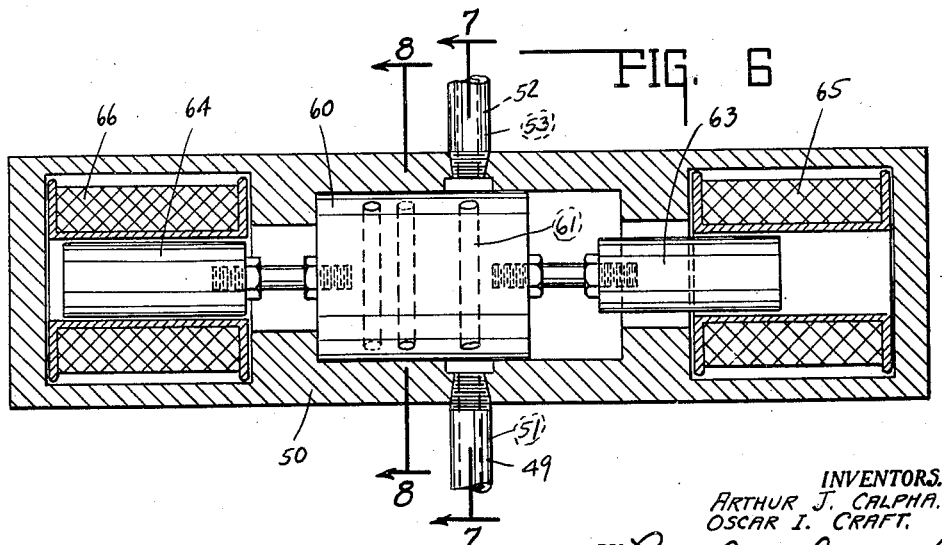
INVENTORS.
ARTHUR J. CALPHA.
OSCAR I. CRAFT.
BY
ATTORNEYS.

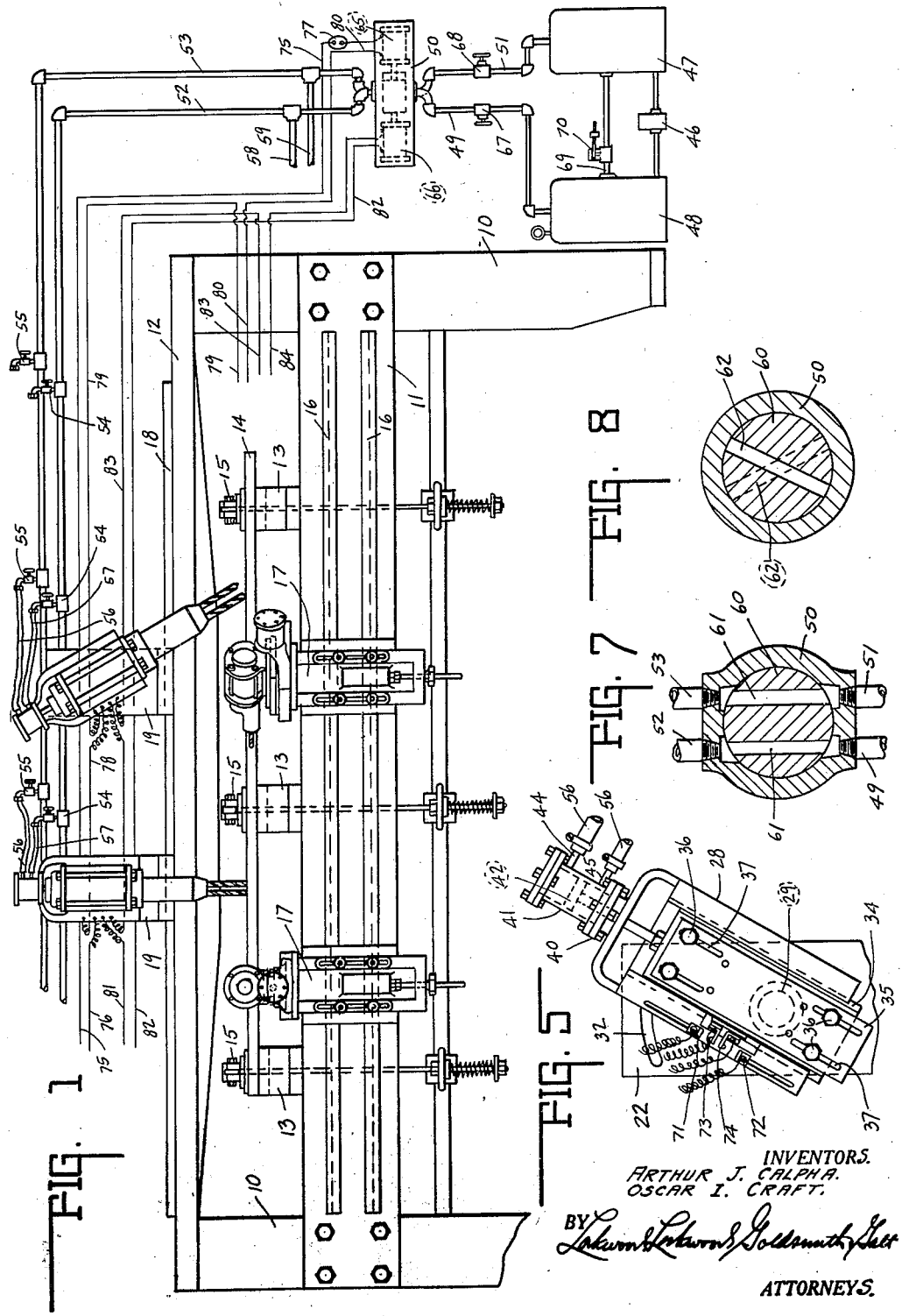

Patented Oct. 2, 1934

1,975,250

UNITED STATES PATENT OFFICE 1,975,250

HYDRAULIC FEED CONTROL APPARATUS

Arthur J. Calpha and Oscar I. Craft, Brazil, Ind., assignors to Indiana Foundry Machine & Supply Company, Brazil, Ind., a corporation Application August 30, 1930, Serial No. 478,932

3 Claims. (Cl. 77—32)

This invention relates to a machine tool. More particularly it relates to a machine tool wherein rotary working tools are used to operate upon a piece of work and wherein said tools are adjustably mounted upon the frame of the machine so that varying operations may be performed thereby.

The principal object of the invention is to simplify the construction so that adjustments of the position and angle of the tools may be made with the least possible loss of time.

Another object of the invention is to provide means whereby a plurality of working tools may be operated in unison upon the same piece of work, said tools being fed toward the work at independent speeds but the advance and retraction of all tools being simultaneously initiated.

The principal feature of the invention resides in the provision of a fluid-operated cylinder for advancing and retracting each of the working tools. Each tool is independently rotated by a motor and the motor, tool and cylinder are all carried upon an adjustable tool-carrying unit. Flexible connections are provided for supplying the working fluid to the cylinder and for supplying current to the motor. Electrical connections are also provided for controlling the supply of fluid dependent upon the travel of the tool. These electrical connections are such that the tools are simultaneously advanced and retracted, the retraction of all of the tools being initiated only upon the completion of the advance of all tools and vice versa. By this means, each tool advances at a speed independent of the others, the said speed depending only upon the resistance offered to the tool by the work, but the initiating of the advancement and retraction of all the tools is done in unison.

While the invention is hereinafter particularly described as applied to a multiple spindle drill press, it is equally applicable for use with milling cutters, reamers or other rotary tools which are to be simultaneously rotated and advanced toward the work.

Other objects and features of the invention will be apparent from the accompanying drawings and the following description and claims:

Fig. 1 is a front elevational view partly diagrammatic of a multiple spindle drill press having the invention applied thereto. Fig. 2 is a side elevational view of one of the adjustable tool-carrying units. Fig. 3 is an end elevational view of the same. Fig. 4 is a sectional view taken on the line 4—4 of Fig. 2. Fig. 5 is a top plan view of a portion of the apparatus of Fig. 2 is an angularly-adjusted position. Fig. 6 is a sectional view of a fluid reversing valve used for controlling the flow of fluid for advancing and retracting the tools. Fig. 7 is a sectional view on the line 7—7 of Fig. 6 and Fig. 8 is a sectional view on the line 8—8 of Fig. 6.

A pair of end frame members 10 carry longitudinal members 11 and 12. The member 11 supports work-holding members 13 upon which are carried a piece of work 14 to be operated upon. The work 14 is clamped to the support members 13 by clamping mechanism 15. The longitudinal support memer 11 is fitted with dovetail members 16 upon which are carried a plurality of tool-supporting units 17. The longitudinal member 12 is fitted with similar dovetail members 18 carrying tool support units 19.

Each of the tool support units 17 includes a base portion 20 having a dovetail groove therein for engaging the dovetail members 16. A support member 22 having substantially the form of an inverted L is clamped to the support member 20 by means of bolts 23 and is maintained in vertical alignment therewith by means of a rearwardly-extending portion 24 of the member 20. The member 22 is vertically movable upon the base member 20 and is adjustable by means of a threaded stem 25 threadedly engaging a rearwardly-extending portion 26 of the member 20 and having an adjusting nut 23 engaging the lower end of the members 22. By means of this, when the bolts 23 have been loosened, the adjusting nuts 27 may be manipulated to raise or lower the member 22.

A support member 28 is carried upon the upper surface of the member 22 and is formed with a downwardly-extending cylindrical portion 29 closely fitting a cylindrical opening in the member 22. A plate 30 is bolted to the under-surface of the cylindrical portion 29 and maintains the member 28 in position with respect to member 22. By this means, the member 28 may be rotated upon the member 22 to any desired position,—as for example, that shown in Fig. 5. When placed in the desired position, the member 28 is retained by means of a bolt 31 passing through an arcuate opening 32 in the member 22 and threadedly engaging the member 28.

The member 28 is fitted with dovetail portions 33 which serve as a guideway for a slidable base member 34 to which is bolted a motor base 35. The said base is maintained in position by bolts 36 passing through slots 37 therein. A motor 38 is bolted to the motor base 35 and carries a drilling tool 39 rotatable thereby. The support member 28 is formed with a rearwardly-extending flange 40 to which is bolted a cylinder 41 having a piston 42 therein. The piston 42 is fastened by means of a rod 43 to the slidable base member 34. Fluid inlets 44 and 45 are provided for admitting fluid to the cylinder 41 on the opposite sides of the piston 42. By means of this construction, the motor base 35 may be so adjusted upon the base member 34 that the tool 39 is in the desired position with respect to the work when the piston 42 is in the retracted position. By the admission of fluid under pressure to the fluid inlet 44, the base member 34, the motor and the tool are forced toward the work for operating thereon. Upon the completion of the operation, fluid under pressure may be admitted through the fluid inlet 45 and the base member 34 with the motor and tool are retracted thereby. The tool-supporting units 19 are exactly similar in every respect to the units 17 but are arranged to bring their tools in contact with the upper surface of the work instead of the side.

For supplying fluid for operating the cylinder 41, a pump 46 is provided adapted to draw fluid, such as oil from a low pressure tank 47 and discharge the same into a high pressure tank 48. The high pressure tank 48 is connected by means of a pipe 49 with a reversing valve 50 shown in detail in Fig. 6. The lower pressure tank 47 is also connected by a pipe 51 with the said valve. Pipes 52 and 53 lead from the valve 50 to a suitable position in the neighborhood of the tool support units 19. The pipe 52 is fitted at suitable intervals with valve-controlled outlets 54 and pipe 53 is fitted with similar valve-controlled outlets 55. A flexible fluid conduit 56 leads from each of the fluid inlets 44 to the nearest convenient outlet 55. Similar flexible conduits 57 connect each of the fluid inlets 45 with one of the outlets 54. The pipes 52 and 53 are fitted with branches 58 and 59, respectively, adapted to be connected in the same manner to the tool support units 17.

The valve 50 is fitted with a plunger 60 having a pair of parallel ports 61 and a pair of diagonally-arranged ports 62. The plunger 60 is connected at one end to an armature 63 and at the opposite end to an armature 64. An electromagnet 65 is associated with the armature 63 and a similar electromagnet 66 is associated with the armature 64. When the magnet 66 is energized, the armatue 64 is attracted thereby to move the plunger to bring the port 61 into registry with pipes 49, 51, 52 and 53 as illustrated in Fig. 7. In this position, high pressure fluid may pass from the high pressure tank 48 through pipe 49, port 61, pipe 52, conduits 57 and fluid inlets 45 into one end of each of the cylinders 41. Similarly, fluid may pass from the opposite end of each of the cylinders through the connection 44, conduits 56, pipe 53, ports 61 and pipe 51 to the low pressure tank 47. Each of the pistons 41 is thereupon moved to the retracted position and the motors and tools are retracted thereby. When the magnet 65 is energized, the armature 63 is attracted thereby, moving the plunger 60 to bring the ports 62 into registry with the pipes 49, 51, 52 and 53. In this position, the flow of fluid in pipes 52 and 53 is reversed and the pistons 42 are moved to advance the motor and tools to engage the work. Valves 67 and 68 are provided in the pipes 49 and 51 for preventing excessive speed of movement of the tools when free from the work. These valves are preferably of the needle type for adjusting the flow of fluid. A connection 69 having a pressure relief valve 79 therein is provided between tanks 48 and 47 for preventing an excess of pressure in tank 48.

Each of the support members 28 is fitted with a pair of adjustably-mounted electrical contact members 71 and 72. The slidable base member 34 carries a pair of electrical contact members 73 and 74. The said contact members are so adjusted that members 71 and 73 engage at the completion of the retraction stroke of the tool while members 72 and 74 engage at the completion of the advance stroke. A pair of wires 75 and 76 are connected to any suitable source of electric power and the wire 75 is connected to a manually-operable push button 77. The wire 76 is connected to the contact member 73 of one of the tool units 19 by a suitable flexible connection. The corresponding contact member 71 is connected by a wire 78 to the terminal 73 of the next tool unit. The contact member 71 of the next unit is similarly connected to a wire 79 leading to one of the tool units 17. Similarly, the contact members 71 and 73 of the units 17 are each connected in series between the wire 79 and a wire 80, the latter wire leading to one terminal of the magnet 65, the opposite terminal of which is connected to the push button 77.

A pair of wires 81 and 82 are also connected to a suitable source of electric current and the wire 82 is connected to one terminal of the magnet 66. The pairs of contact members 72 and 74 of the tool units 19 are connected in series between the wire 81 and a wire 83. The corresponding pairs of contact members of the tool units 17 are connected in series between the wire 83 and a wire 84 connected to the opposite terminal of the magnet 66. By this wiring, it will be evident that the magnet 66 is energized for initiating the retraction of the tools only when all of the tools have advanced to the end of their strokes to cause engagement of all of the contact members 72 and 74. Similarly, the magnet 65 may be energized by push button 77 to cause advancement of the tools only when all of said tools have reached the retracted position, at which position all of the contact members 71 and 73 are in engagement.

In the operation of the device, the motor 46 is continually operated to maintain a desired pressure in the tank 48. With the tools in the retracted position, a piece of work is placed upon the supports 13 and clamped thereon. The push button 77 is then operated to energize the magnet 65 and permit high pressure fluid to enter pipe 53 for advancing the tools. Upon the completion of the advance stroke of all of the tools, the magnet 66 is energized, permitting entrance of high pressure fluid through pipe 52 for retraction of the tools. At the completion of the retraction stroke of all of the tools, they are brought to rest until the work has been removed and replaced and the push button 77 has again been actuated. It is, therefore, impossible to commence the retraction of any one tool until the others have been completely advanced and it is impossible to commence the advancing of any one tool until the others have all been retracted. The speed of advance and retraction of each tool is independent of that of the others, being dependent only upon the resistance offered to the tool and yet the tools are operable in unison.

The invention claimed is:

1. In a machine tool having work-holding means and a plurality of rotatable working tools adapted to engage work held thereby, the combination of a double-acting fluid-operable cylinder for advancing and retracting each of said tools, means for supplying a fluid under pressure to one end of each of said cylinders for advancing said tools to engage said work, a single reversing mechanism for supplying fluid under pressure to the opposite ends of all of said cylinders for retracting said tools, a member movable by movement of each of said tools, and control apparatus actuating said reversing mechanism and operable only by engagement with all of said movable members upon completion of the advance strokes of all of said tools.

2. In a machine tool having work-holding means and a plurality of rotatable working tools adapted to engage work held thereby, the combination of a double-acting fluid-operable cylinder for advancing and retracting each of said tools, means for supplying a fluid under pressure to one end of each of said cylinders for advancing said tools to engage said work, a single electrically operated reversing mechanism for supplying fluid under pressure to the opposite ends of all of said cylinders for retracting said tools, an electric switch associated with each of said tools, a member movable by movement of each of said tools, each of said members actuating one of said switches upon completion of the advance stroke of its corresponding tool, and electrical connections between said switches and said reversing mechanism whereby the actuation of said reversing mechanism is accomplished only upon the actuation of all of said switches.

3. In a machine tool having work-holding means and a plurality of rotatable working tools adapted to engage work held thereby, the combination of a double-acting fluid-operable cylinder for advancing and retracting each of said tools, means for supplying a fluid under pressure to one end of each of said cylinders for advancing said tools to engage said work, a single electrically operated reversing mechanism for supplying fluid under pressure to the opposite ends of all of said cylinders for retracting said tools, an electric switch associated with each of said tools, a member movable by movement of each of said tools, each of said members actuating one of said switches upon completion of the advance stroke of its corresponding tool, and an electrical circuit for actuation of said electrically operated reversing mechanism, said circuit including all of said switches in series whereby the same may be completed only after actuation of all of said switches.

ARTHUR J. CALPHA.
OSCAR I. CRAFT.